US012731299B2

(12) United States Patent
Connor

(10) Patent No.: US 12,731,299 B2
(45) Date of Patent: Sep. 8, 2026

(54) GRAPHICS RENDERING SYSTEM AND METHOD

(71) Applicant: Sony Interactive Entertainment Inc., Tokyo (JP)

(72) Inventor: Patrick John Connor, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 166 days.

(21) Appl. No.: 18/411,097

(22) Filed: Jan. 12, 2024

(65) Prior Publication Data

US 2024/0249447 A1 Jul. 25, 2024

(30) Foreign Application Priority Data

Jan. 19, 2023 (GB) ..................................... 2300800

(51) Int. Cl.

*G06T 11/00* (2026.01)
*G01K 3/00* (2006.01)
*G06F 3/01* (2006.01)
*G06T 1/20* (2006.01)
*G06T 7/70* (2017.01)

(52) U.S. Cl.

CPC .............. *G06T 11/00* (2013.01); *G01K 3/005* (2013.01); *G06F 3/013* (2013.01); *G06T 1/20* (2013.01); *G06T 7/70* (2017.01); *G06T 2207/30196* (2013.01)

(58) Field of Classification Search

CPC ... G06T 11/00; G06T 7/70; G06T 1/20; G06T 2207/30196; G01K 3/005; G06F 3/013
USPC .......................................................... 345/522
See application file for complete search history.

(56) References Cited

U.S. PATENT DOCUMENTS

2017/0330496 A1* 11/2017 Oravainen ............ G06T 3/4092
2018/0040097 A1* 2/2018 Saleh ........................ G06T 5/70
2018/0292895 A1* 10/2018 Schluessler ............. G06F 3/011
2022/0365348 A1* 11/2022 Hanumante ............... G06F 1/26

OTHER PUBLICATIONS

Combined Search and Examination Report for corresponding GB Application No. 2300800.6, 5 pages, dated July 3, 2023.

* cited by examiner

*Primary Examiner* — Hai Tao Sun
(74) *Attorney, Agent, or Firm* — Fish & Richardson P.C.

(57) ABSTRACT

A graphics rendering system includes: a rendering unit configured to render image content for display; and one or more sensors respectively operable to detect a temperature within or proximate to at least a respective part of the graphics rendering system, where if a value of at least one of the detected temperatures meets or exceeds a respective threshold value, then the rendering unit is configured to render a first part of the image content at a first image quality and render a second part of the image content at a second image quality different from the first image quality.

20 Claims, 3 Drawing Sheets

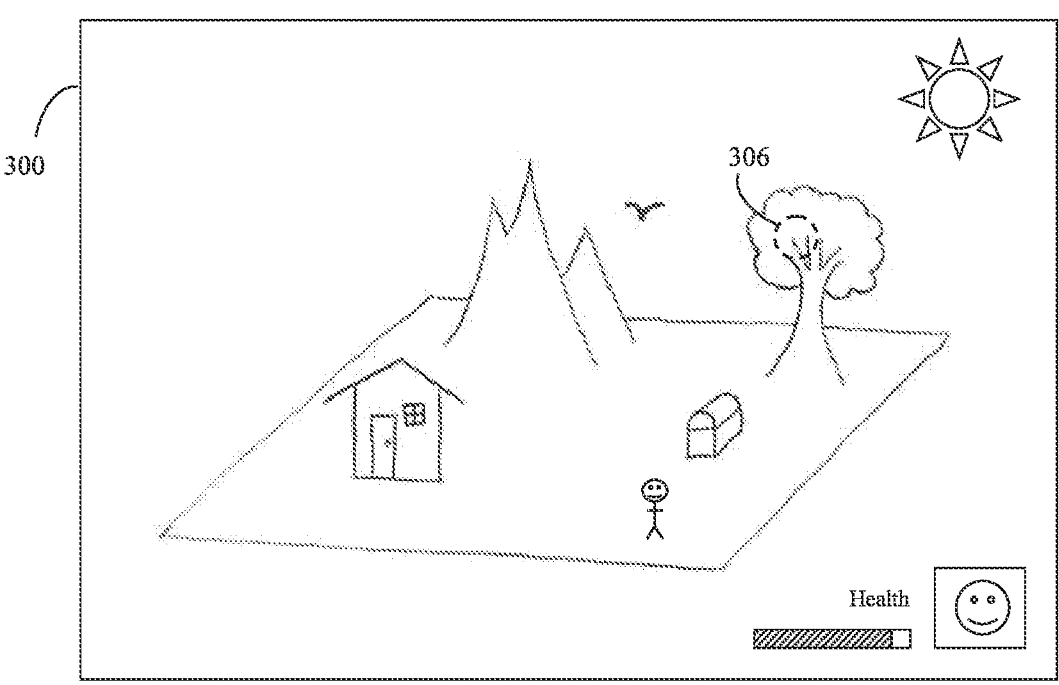
*Figure 3C*
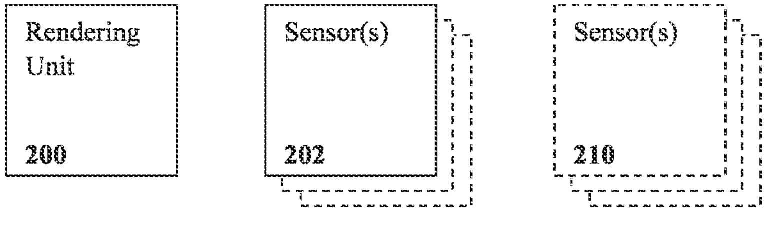
*Figure 4*
Render image content using rendering unit
S100
Render different parts at different image qualities
S100A
Detect temperature(s) using one or more sensors
S102
*Figure 5*

GRAPHICS RENDERING SYSTEM AND METHOD

BACKGROUND OF THE INVENTION

Field of Invention

The present invention relates to a graphics rendering system and method.

Description of the Prior Art

The complexity of graphics rendering techniques/processes has increased in recent years. One of the reasons for this increase in rendering complexity lies in the desire to generate richer, more detailed, and more realistic rendered image content (video games, animated movies, and the like).

However, this increase in rendering complexity place a greater computational burden on the processors which are used to render the image content, such processors having to perform a greater number of calculations and/or having to perform more complex calculations. This increase in computational burden may cause the operating temperatures of such processors to increase, which could lead to the processor being irreparably damaged (or at least diminish/degrade the effectiveness of the processor in terms of efficiency/operating capabilities).

Moreover, such a great number and/or high complexity of calculations may similarly affect other components of a graphics rendering system comprising the processor. For example, a memory may be utilised to a greater extent in order to perform these burdensome calculations, therefore increasing its operating temperature.

Alternatively or in addition, this risk of damage/degradation may arise due to external factors such as the temperature of the real-world environment in which the processor is situated (a room in a house, a server rack, or the like). For example, high ambient temperatures could cause the processor's (and memory's) operating temperature to increase; the heat from an ambient fluid surrounding the processor (and memory) may be transferred therein due to conduction, convention, and/or radiation, for example.

Alternatively or in addition to processor damage/degradation, the high operating temperature of the processor may cause user discomfort and/or injury, this being especially the case where the processor (and memory) in question is comprised within a device that is often kept in close proximity to the user (a laptop, a portable games console, a mobile phone, a fitness tracker, a head mounted display, or the like).

The present invention seeks to alleviate or mitigate these issues.

SUMMARY OF THE INVENTION

In a first aspect, a graphics rendering apparatus is provided in claim 1.

In another aspect, a graphics rendering method is provided in claim 14.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A-3C schematically illustrate various foveated rendering techniques that fall within the scope of embodiments of the present description;

FIG. 4 schematically illustrates a graphics rendering system according to embodiments of the present description; and FIG. 5 schematically illustrates a graphics rendering method according to embodiments of the description.

DESCRIPTION OF THE EMBODIMENTS

A graphics rendering system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such a system.

Figure 1:
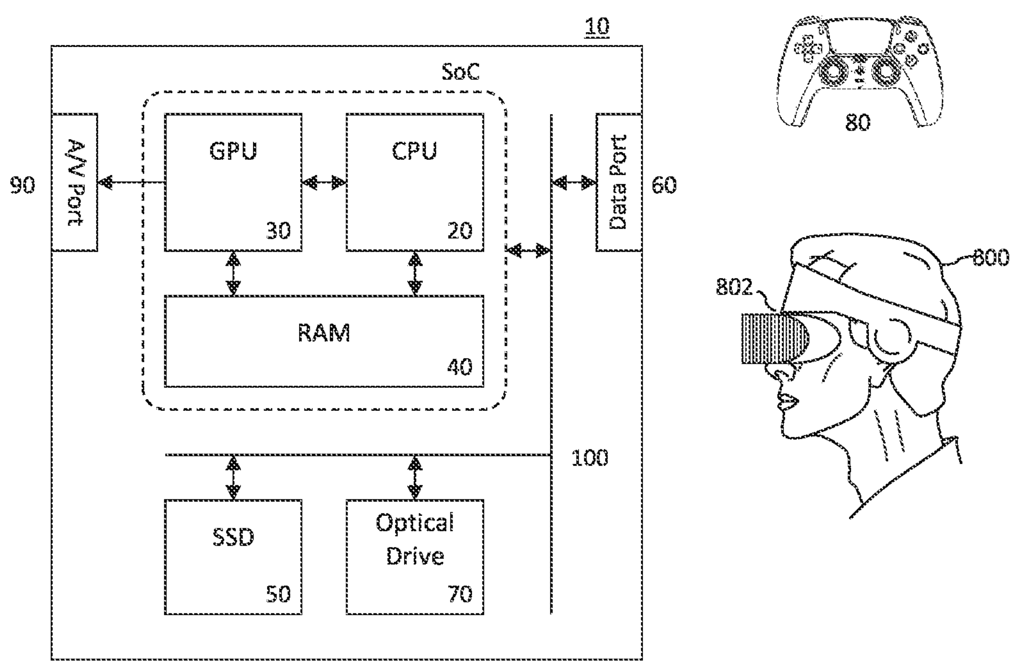
FIG. 1 schematically illustrates an entertainment system operable as a graphics rendering system according to embodiments of the description.

Referring now to the drawings, wherein like reference numerals designate identical or corresponding parts throughout the several views, in FIG. 1 an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

As mentioned previously, a processor that renders image content (such as a CPU, GPU, or the like) may be susceptible to damage/degradation due to its own operating temperature falling outside of an optimal operating temperature range. This may also be the case for other components communicating with the processor (a memory, I/O bridge, data port, power source, or the like). This may be due to the computational burden placed upon the processor (and other components) and/or an ambient temperature affecting (the device comprising) the processor (and other components). Alternatively or in addition, the non-optimal operating temperature of the processor (and other components) may cause user discomfort and/or injury, this being especially the case where the processor (and other components) is in close proximity to the user (due to being comprised within a wearable or portable device, for example).

One way in which these issues could be alleviated or mitigated is by reducing the number and/or complexity of the rendering processes that are carried out by the processor (and other components). However, this is not ideal, as the resulting image quality (resolution, object texturing/shading, or the like) of the rendered image content will be reduced, which may lead to users not finding the image content immersive, or even having their state of immersion/suspension of disbelief broken (if the quality reduction occurs during gameplay as opposed to at a time prior to launch of the image content). Moreover, in this latter case, the reduction in quality could cause user discomfort. This is especially apparent in the case where the quality reduction occurs suddenly and/or the extent of quality reduction is large; the rapidity/magnitude of the quality reduction may cause the user to experience a jarring effect.

Therefore, there is a need in the art for means that enable the computational burden placed on a processor that renders image content (and other components in communication therewith) to be adapted in response to a temperature thereof (or proximate thereto) while ensuring that the user's immersive state is not broken due to such adaptation. Such means would advantageously reduce the risk of the processor (and other components) being damaged/degraded due to the high operating temperatures such processors (and other components) experience when placed under a large computational burden. Alternatively or in addition, such means would advantageously reduce the risk of user discomfort/injury. Firstly, such means would enable the operating temperature of the processor (and other components) to be maintained such that it does not become uncomfortably/painfully high while the user wears/carries/interacts with the device that comprises the processor rendering the image content (and other components). Secondly, such means provide a reduction in the likelihood of the user experiencing jarring changes in image quality of the image content.

Graphics Rendering Apparatus

Figure 2A:
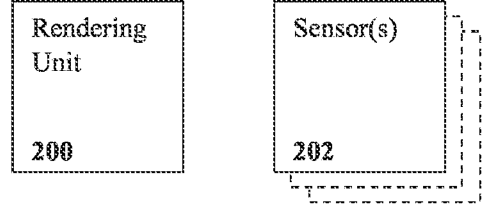
FIG. 2A-2C schematically illustrate various graphics rendering systems according to embodiments of the description.

Accordingly, turning now to FIG. 2A, in embodiments of the present description, a graphics rendering system comprises rendering unit 200 configured to render image content for display; and one or more sensors 202 respectively operable to detect a temperature within or proximate to at least a respective part of the graphics rendering system, wherein if a value of at least one of the detected temperatures meets or exceeds a respective threshold value, then the rendering unit is configured to render a first part of the image content at a first image quality and render a second part of the image content at a second image quality different from the first image quality.

In an entirely non-limiting example, consider a graphics rendering system comprising rendering unit 200 (one or more CPUs and/or GPUs, for example), and two sensors 202, where a first sensor is operable to detect a temperature within at least part of the graphics rendering system (a temperature of a compartment thereof which contains rendering unit 200, for example), and a second sensor is operable to detect a temperature proximate thereto (an ambient temperature of a real-world environment in which the graphics rendering system resides, for example). While rendering the image content, the operating temperature of rendering unit 200 may increase due to the computational burden placed thereon. Accordingly, the first sensor may detect the temperature within the compartment containing rendering unit 200, and once the detected temperature meets or exceeds its respective threshold temperature (a threshold temperature which is associated with the first sensor and/or the compartment in question, for example), then rendering unit 200 may render a first part of the image content at a first image quality and render a second part of the image content at a second quality which is different from the first quality (and, for example, at a lower quality than the first quality). As will be appreciated by persons skilled in the art, such a rendering process may be thought of as being analogous to foveated rendering. Indeed, the first part (or equally the second part) may coincide with a particular part of the image content that the user's gaze is currently directed towards.

Alternatively or in addition, the second sensor may detect the ambient temperature of the real-world environment in which the graphics rendering system resides (a room in a house, a server rack, a pocket of an item of clothing, or the like), and once the detected temperature meets or exceeds its respective threshold temperature (a threshold temperature which is associated with the second sensor and/or the real-world in question, for example), then rendering unit 200 may render the image content in the previously described manner.

By making rendering unit 200 render in such a manner in response to one or more above-threshold temperatures, the computational burden placed thereon may be reduced. This is because rendering unit 200 may now perform fewer and/or less complex computations on, say, the second part of the image content in order to reduce the image quality thereof relative to that of the first part of the image content. This reduced computational burden on rendering unit 200 (due to at least part of the image content requiring fewer and/or less complex computations to render it) may lead to a reduction in the operating temperature thereof (or at least lead to a prevention in the temperature thereof rising to such an extent that rendering unit 200 is damaged/degraded, and/or the user is injured/made uncomfortable).

Additionally, rendering in such a manner may also help to regulate the temperature of other components of the graphics rendering system. For example, when using fewer and/or less complex computations for a part of the image content, the memory of the graphics rendering system (RAM, ROM, HDD, SSD, or the like) may be utilised less, and therefore the temperature thereof may be reduced to or maintained at an appropriate operating temperature. As will be appreciated by persons skilled in the art, the same reasoning may apply to yet other components of the graphics rendering system such as an I/O bridge, a data port, and the like, or a source of electrical energy for the graphics rendering system such as a battery, a connection to mains electricity, or the like. Again, such temperature regulation of the various components of the graphics rendering system may have to advantageous effect of reducing user discomfort/injury.

Whereas the present description primarily discusses the activation of a foveated rendering process in response to an internal/external temperature meets or exceeds a given threshold, persons skilled in the art will readily appreciate that the deactivation of such foveated rendering when the internal/external temperature falls below the given threshold is considered within the scope of embodiments of the present description. Similarly, optionally hysteresis (for example in the form of a latching filter) may be applied when the temperature fluctuates around the threshold so that foveated rendering is not turned on and off too frequently.

Rendering Image Content

In embodiments of the present description, rendering unit 200 is configured to render image content for display. In embodiments of the present description, rendering unit 200 may be one or more CPUs (such as CPU 20, for example) and/or one or more GPUs (such as GPU 30, for example).

The image content may be a still image, or may be a sequence of image frames that form a moving image when displayed successively. Moreover, the image content may be associated with a video game, a virtual/augmented/mixed reality application, an animated movie, or any other interactive application/software whose image content requires rendering prior to display.

Detecting Temperature(s)

In order to regulate the temperature of rendering unit 200 (and optionally other components of the graphics rendering system, as mentioned previously), the temperature within or proximate to the graphics rendering system comprising rendering unit 200 should be ascertained. Such ascertained temperature(s) may then be evaluated against respective thresholds to determine whether rendering unit 200 (and optionally other components) are operating at a temperature that may cause damage thereto or degradation thereof, or may cause discomfort/injury to users of the graphics rendering system.

Therefore, in embodiments of the present description, one or more sensors 202 are respectively operable to detect a temperature within or proximate to at least a respective part of the graphics rendering system. It should be noted that the term "respectively operable" as used herein should be taken to mean that each of the one or more sensors are operable to either detect a temperature within at least a respective part of the graphics rendering system, or detect a temperature proximate to at least a respective part of the graphics rendering system.

As a non-limiting example of detecting temperature proximate to a respective part of the graphics rendering system, one or more of the sensor(s) 202 may be respectively operable to detect the surface temperature of an object that is in contact with a respective part of the graphics rendering system, such as a table/desk/shelf/rack on which the graphics rendering system stands.

Alternatively or in addition, one or more of the sensor(s) 202 may be respectively operable to detect a temperature of an ambient fluid that surrounds or is contained within a respective part of the graphics rendering system. Such an ambient fluid may be the air in a room within which the graphics rendering system is situated. Alternatively, the ambient fluid in question may be a liquid. For example, some high end gaming PCs comprise a water-charged heat exchanger, where the heat generated by the processor (or other components) thereof is transferred (by way of conduction/convection) into the cold water stream via the wall of the pipe carrying the water. As another example, some data centres, supercomputers, server racks, or the like are completely submersed in a liquid coolant, the processors (and other components) thereof being brought into direct contact with the coolant so that the heat generated may be directly transferred to the coolant (which flows over/around the components for increased convective cooling).

Regarding types of sensors, the one or more sensor(s) 202 may comprise at least one of: (i) thermometer; (ii) a temperature probe; and (iii) a thermal camera.

It should be noted that the preceding examples are not exhaustive; persons skilled in the art will appreciate that sensors operable to detect temperature other than those mentioned previously are considered within the scope of the present description.

In any case, each of the sensor(s) 202 may detect the temperature within or proximate to at least a respective part of the graphics rendering system.

Rendering Parts of Image Content at Different Image Qualities

In embodiments of the present description, it is desirable for rendering unit 200 to trigger a foveated rendering process when the internal or external temperature (and optionally other parameters) meet or exceed a tolerable/safe/comfortable (range of) value(s), and thereby reduce the computational burden placed thereupon, which in turn reduces (or at least slows the rate of increase in) the operating temperature thereof. As mentioned previously, this advantageously reduces the likelihood/extent of rendering unit 200 (and other components) being damaged/degraded due to overheating, and/or reduces the likelihood/extent of user discomfort/injury.

Therefore, in embodiments of the present description, if a value of at least one of the detected temperatures meets or exceeds a respective threshold value, then rendering unit 200 is configured to render a first part of the image content at a first image quality and render a second part of the image content at a second image quality different from the first image quality.

In short, rendering unit 200 may render the image content in accordance with a foveated rendering scheme (where different parts of the image content is rendered at different image qualities) in the event that one of the detected temperature meets or exceeds its respective threshold. It should be noted that the temperature thresholds in question may be predetermined or user defined, immutable or dynamically adjustable. Moreover, a given temperature need not relate to the temperature per se, but may alternatively or additionally relate to rates of change in temperature with respect to time, for example. For example, an above-threshold first derivate of temperature with respect to time may suggest that the environment/apparatus internals are heating up at a rate which could lead to processor (or other component) damage, or could lead to user injury/discomfort. As will be appreciated by persons skilled in the art, the second (and any other) derivate of temperature with respect to time may be similarly considered for such purposes. Furthermore the rate of change and duration of that rate may be used to determine whether to enable foveated rendering: hence for example a GPU hovering around a threshold of 40 degree centigrade with occasional spikes to 50 might not trigger foveated rendering because the 50° temperatures did not last long, whereas a GPU steadily increasing in temperature from 30 degrees centigrade for some predetermined period of time might trigger foveated rendering arrest this consistent increase before it reached a predetermined threshold; in short the type of temperature change may be characterised and absolute temperature, derivative, or period thresholds adjusted accordingly.

The term "image quality" as used herein can be construed as relating to the amount/level of visual detail of the image content. As will be appreciated by persons skilled in the art, various rendering processes and/or attributes affect the image quality (that is the level of detail) of the image content. For example, processes such as lighting, texturing, shading, rasterization, or the like, and attributes such as the level of detail of a given virtual element's mesh, or the like may affect the image quality of the image content. For example, varying the precision of rasterization results in a varied pixel resolution (and thus the level of detail, image quality) of the image content. It should be noted that the preceding examples are not exhaustive; persons skilled in the art will appreciate that factors and techniques affecting the image quality (the level of detail) of the image content other than those mentioned previously are considered within the scope of the present description. For example, within 2×2 pixel blocks partial renderings such as ¾, 2/4, or ¼ pixel renders with interpolation for unrendered pixels can be used to effectively reduce image quality and associated processor load.

As a non-limiting example of foveated rendering, rendering unit 200 may execute a first total number of rendering processes to render a first part of the image content at a first image quality, and execute second total number of rendering processes (that is different from the first) to render a second part of the image content at a second image quality. Alternatively or in addition, rendering unit 200 may execute rendering processes at a first precision to render a first part of the image content at a first image quality, and execute rendering processes at a second precision (that is different from the first) to render a second part of the image content at a second image quality. Alternatively or in addition, rendering unit 200 may utilise attributes of a first level of detail to render a first part of the image content at a first image quality, and utilise attributes of a second level of detail (that is different from the first) to render a second part of the image content at a second image quality.

Moreover, various foveated rendering techniques falling within the scope of embodiments of the present description shall be discussed with reference to FIGS. 2A-2C and FIGS. 3A-3C, which depict image content of a video game. More specifically, such techniques are related to determining which parts of the image content are to be rendered at which image quality.

Figure 3A:
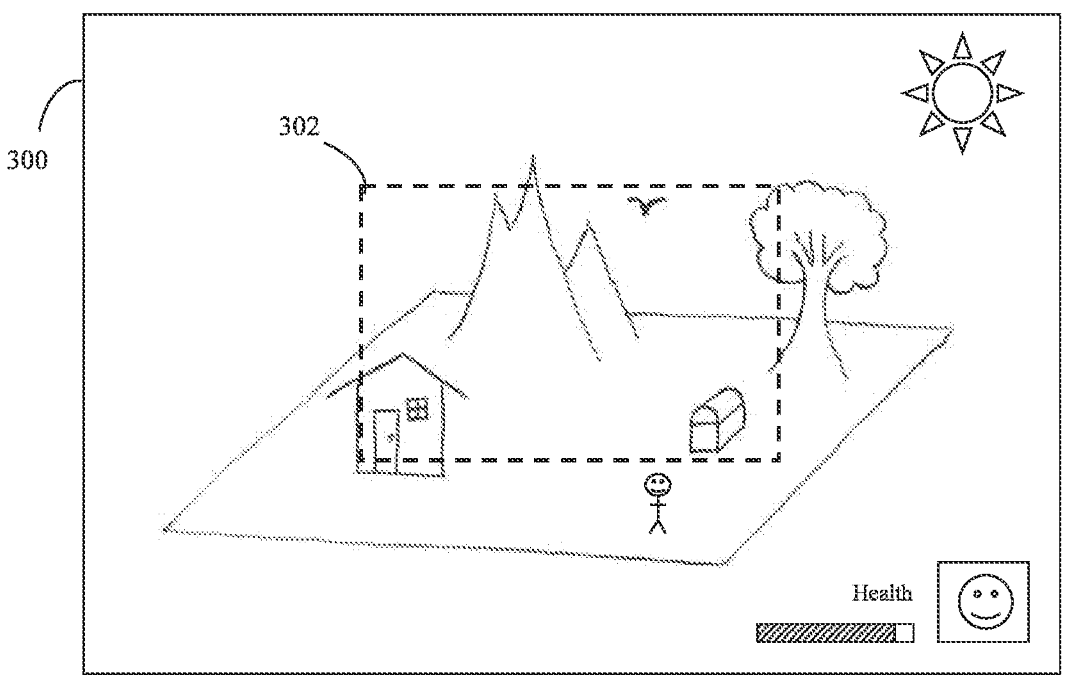

Optionally, and turning now to FIGS. 2A and 3A, the first part of the image content may correspond to a predefined region of a display screen that displays the image content. That is to say, rendering unit 200 may be configured to render image content that falls within a predefined region of display screen 300 at a first image quality, such a predefined region being region 302, for example. As a non-limiting example, rendering unit 200 may render the part of the image content falling within region 302 at a higher image quality than the part of the image content falling outside of region 302.

As seen in FIG. 3A, the region is rectangular in shape and is centrally located on screen 300. However, and as will be appreciated by persons skilled in the art, region 302 may take on any shape, size, and location on screen 300. More generally, the shape, size, and/or location of the predefined region (region 302) may be predetermined (by rendering unit 200, for example) or user defined (by using a video game controller, mouse, keyboard, or the like), immutable or dynamically adjustable.

Figure 3B:
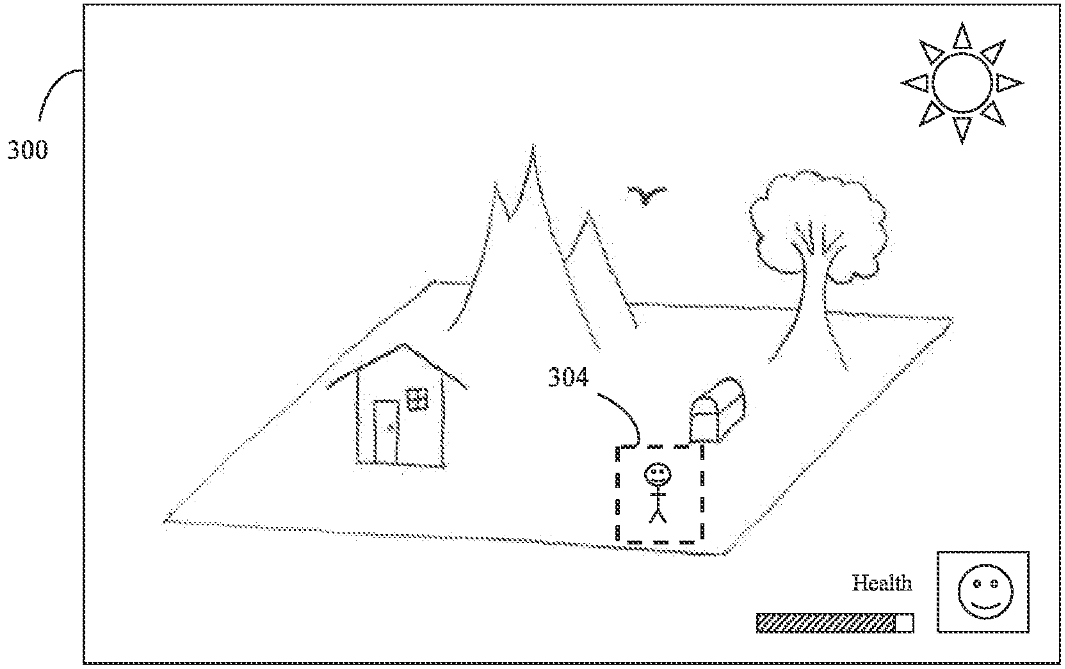

Alternatively, and turning now to FIG. 3B, the first part of the image content may correspond to a region of a display screen within which a given virtual element comprised within the image content is located. That is to say, rendering unit 200 may be configured to detect a given virtual element within the image content, and render a region of screen 300 that comprises the virtual element at a first image quality, such a region being region 304, which comprises a virtual character. As a non-limiting example, rendering unit 200 may render the part of the image content falling within region 304 at a higher image quality than the part of the image content falling outside of region 304.

As will be appreciated by persons skilled in the art, the region comprising the given virtual element may be of any shape or size. More generally, the shape/size of the region comprising the given virtual element may be predetermined or user defined, immutable or dynamically adjustable.

Regarding virtual element detection, rendering unit 200 may be configured to detect one or more virtual elements comprised within the image content by analysing data/metadata associated with the image content. For example, the geometry of each virtual element is typically defined by mesh data. As such, rendering unit 200 may be configured to detect one or more virtual elements by obtaining their respective mesh data, or meta data/object data associated with the mesh or corresponding texture assets.

Alternatively or in addition, rendering unit 200 may be configured to detect one or more virtual elements comprised within the image content by using any commonly known computer vision/object recognition techniques/algorithms.

The terms "computer vision algorithm" and "object recognition algorithm" refer to any suitable computer-implemented method, software, algorithm, or the like, which causes a computer (such as the apparatus described herein) to recognise/detect objects, animals, humans, or the like from captured images. Such algorithms are well-known in the art, examples of which include Viola-Jones detection methods (optionally based on Haar features), scale-invariant feature transforms (SIFTs), histogram of oriented gradients (HOG) features, and the like. Alternatively or in addition, machine learning and methods, neural networks, artificial intelligence, or the like may be used to recognise/detect objects and the like. Examples of neural network approaches include region based convolutional neural networks (R-CNNs), single shot multi-box detectors (SSDs), you only look once (YOLO) methods, single-shot refinement neural networks for object detection (RefineDets), Retina-Net, deformable convolutional networks, and the like.

Figure 2B:
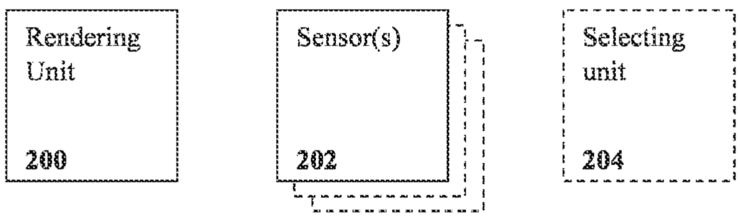

Alternatively or in addition, and turning now to FIG. 2B, the graphics rendering system may comprise selecting unit 204, which may be configured to select the given virtual element in dependence upon one or more aspects of the image content, the one or more aspects of the image content comprising at least one of: (i) a size and/or shape of the given virtual element within the image content; (ii) a motion of the given virtual element within the image content (this may be a travelling motion such as running or the like, or may be a gestural motion such as a hand wave or the like); and (iii) whether the given virtual element is controllable by a user interacting with the image content (the user in question being any user interacting with the image content by way of controlling their respective virtual element/character/avatar).

Selecting unit 204 may be one or more CPUs (such as CPU 20, for example) and/or one or more GPUs (such as GPU 30, for example).

In embodiments where selecting unit 204 is used after a prior detection of virtual elements (by obtaining the mesh data thereof and/or by computer vision/object recognition techniques), then selecting unit 204 may be used to select which one of the detected virtual elements are to be rendered at the first image quality. As will be appreciated by persons skilled in the art, the larger, more mobile, and/or more controllable virtual elements in the image content are likely to attract the attention of the user interacting therewith. As such, the user is more likely to gaze at such virtual elements during playback of the image content. Therefore, by using size, shape, motion, and/or user controllability as selection criteria, selecting unit 204 may select a virtual element that the user is most likely to be gazing at when interacting with the image content. Once this virtual element is selected, rendering unit 200 may render the image content which falls outside of the region comprising the virtual element (region 304, for example) at a lower image quality than that within the region in order that the user, who is most likely gazing at this virtual element, does not perceive any reduction in the image quality of part of the image content.

Alternatively, in embodiments where selecting unit 204 is used without prior virtual element detection taking place, selecting unit 204 may itself perform a de facto virtual element detection by way of selecting the given virtual element in dependence upon size, shape, motion, and user controllability. As will be appreciated by persons skilled in the art, the benefits of virtual element selection as was discussed in the preceding paragraph also apply here.

In any case, and optionally, rendering unit 200 may be configured to track the location of the given virtual element within the image content, and adapt/update the location of the region of the display screen (which should comprise the given virtual element) in dependence upon the tracked location of the virtual element. Within the context of FIG. 3B, region 304 may move with the virtual character in order that the virtual character is comprised within region 304 while the virtual character is moving within the image content.

Figure 2C:
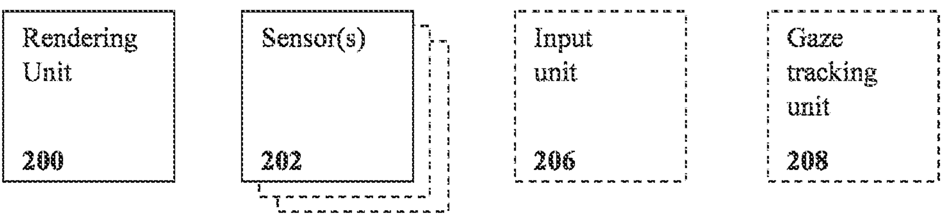

Alternatively, and turning now to FIGS. 2C and 3C, the graphics rendering system may comprise input unit 206 configured to receive one or more images of one or both eyes of a user; and gaze tracking unit 208 configured to determine, for a display screen that displays the image content, a region of the display screen towards which a gaze of the user is directed in dependence upon one or more of the received images; wherein the first part of the image content corresponds to a region of the display screen that comprises the determined region.

That is to say, rendering unit 200 may be configured to render image content that falls within a currently gazed-at region of display screen 300 at a first image quality, such a predefined region being region 306, for example. As a non-limiting example, rendering unit 200 may render the part of the image content falling within region 306 at a higher image quality than the part of the image content falling outside of region 306.

As will be appreciated by persons skilled in the art, the gazed-at region may be of any shape or size. More generally, the shape/size of the gazed-at region may be predetermined or user defined, immutable or dynamically adjustable.

In embodiments of the present description, input unit 206 may be one or more data ports, such as data port 60, USB ports, Ethernet® ports, Wi-Fi® ports, Bluetooth® ports, or the like. The images of the user's eye(s) received at input unit 206 may be captured by one or more cameras such as conventional shutter cameras, event cameras, infrared cameras, or the like. The images may be received via wired or wireless communication methods such as USB, Ethernet®, Wi-Fi®, Bluetooth®, the Internet, LAN, WLAN, or the like.

In embodiments of the present description, gaze tracking unit 208 may be one or more CPUs (such as CPU 20, for example) and/or one or more GPUs (such as GPU 30, for example). In some embodiments, such processing units may be provided with the gaze tracking cameras in an integrated fashion. Gaze tracking unit 208 may be configured to determine the user's gaze direction based on the received images by using any commonly known gaze tracking techniques, a non-limiting example of which being feature-based detection methods (that is, detecting the locations of pupils, irises, corneas and/or corneal reflections within the images of the user's eye(s)).

Feature-based detection methods may involve the use of facial feature detection algorithms. As such, gaze tracking unit 208 may be configured to detect (features of) the eye(s) of the user in one or more of the received images by using one or more facial feature detection algorithms (or components thereof) as required. The term "facial feature detection algorithm" refers to any suitable computer-implemented method, software, algorithm, or the like, which causes a computer (such as the graphics rendering apparatus described herein) to detect facial features (and optionally, inter-feature relationships) from images of a face. Such facial feature detection algorithms are well-known in the art. Examples of such algorithms include eigenfaces, cigenfeatures, fisherfaces, or the like. Moreover, machine learning and methods, neural networks, artificial intelligence, or the like may be used to detect facial features (and inter-feature relationships).

As will be appreciated by persons skilled in the art, rendering the gazed-at region of the display at a different image quality to that of the non-gazed-at regions of the display may be thought of as analogous to conventional foveated rendering methodologies.

Regardless of the method employed for the determination of the display screen region within which the image content is rendered at the first image quality, rendering unit 200 may be configured to adapt at least one of: (i) a size and/or shape of the first part of the image content (the part of the image content that is rendered at a first image quality); and (ii) a size and/or shape of the second part of the image content (the part of the image content that is rendered at a second image quality)—in dependence upon an extent to which the value of the at least one of the detected temperatures exceeds the respective threshold value.

As a non-limiting example, responsive to an above-threshold internal or external temperature increasing, rendering unit 200 may be configured to reduce the size of the first part of the image content. This may be particularly beneficial in a case where the first part of the image content comprises image content that is rendered at a relatively higher image quality. This is because the amount of image content being rendered at the higher image quality has been reduced, which thus reduces the computational burden placed on rendering unit 200 (any other components), which in turn reduces (or at least slows the rate of increase in) the operating temperature(s) thereof.

Alternatively or in addition, rendering unit 200 may configured to adapt at least one of: (i) the first image quality; and (ii) the second image quality, in dependence upon an extent to which the value of the at least one of the detected temperatures exceeds the respective threshold value.

As a non-limiting example, responsive to an above-threshold internal or external temperature increasing, rendering unit 200 may be configured to reduce the second image quality. This may be particularly beneficial in a case where the second part of the image content (that is rendered at the second image quality) is larger in size (in screen area, for example) than the first part of the image content (that is rendered at the first image quality). This is because the reduction in the second image quality affects a larger portion of the image content than would reducing the first image quality, and thus the computational burden placed on rendering unit 200 (any other components) may be reduced by a greater extent.

As will be appreciated by persons skilled in the art, while discussion has mainly focused on a first part and a second part of the image content (and respective image qualities), embodiments of the present description are not limited to exclusively two parts of the image content at respect image qualities. Rather, the rendering of more than two parts of the image content at respective image qualities may also being considered to fall within the scope of embodiments of the present description. As such, the preceding discussion regarding the adapting of the size/shape of respective parts of the image content and/or adapting the image quality of respective parts of the image content equally apply where more than two parts of the image content are rendered by rendering unit 200 at respective image qualities.

Moreover, rendering unit 200 may be configured to adapt a total number of parts of the image content that are to be rendered at a respective image quality in dependence upon an extent to which the value of the at least one of the detected temperatures exceeds the respective threshold value.

As a non-limiting example, once an internal or external temperature meets its respective threshold, rendering unit 200 may trigger a foveated rendering where the image content is split into 5 parts, where each part of the image content is rendered at a different image quality. The arrangement of the 5 parts may be analogous to that of a dart board/shooting target in that the first part is a circular region, and each successive part is an annular region that surrounds the immediately preceding part. As the internal or external temperature rises, rendering unit 200 may reduce the total number of parts of the image content that are rendered at respective image qualities. For example, rendering unit 200 may now split the image content into 3 parts instead of 5, while maintaining the dart board/shooting target arrangement. This may be achieved by merging the outer two annular regions into one annular region, and merging the inner two annular regions into one annular region, the circular region being maintained as-is, for example.

This may be beneficial as the computational burden placed on rendering unit 200 (and other components) may be reduced; each of the new annular regions may be rendered at the lowest of the two image qualities at which the respective pair of annular regions merged to form it were rendered, for example, which would therefore decrease the image qualities in parts of the image content.

In any case, and as will be appreciated by persons skilled in the art, by triggering foveated rendering in response to a detected temperature within or proximate to at least part of a graphics rendering system meeting or exceeding a threshold temperature, the operating temperature of rendering unit 200 (and other components) thereof which is/are used to render image content may be kept within a tolerable/safe/comfortable (range of) value(s). This advantageously reduces the likelihood/extent of rendering unit 200 (and other components) being damaged/degraded due to overheating, and/or reduces the likelihood/extent of user discomfort/injury.

Portable/Wearable Devices

As mentioned previously, embodiments of the present description advantageously reduce the likelihood/extent of user injury, as the operating temperature of rendering unit 200 (and other components) may be kept at a tolerable/safe/comfortable (range of) value(s). This is especially apparent in a case where rendering unit 200 is comprised within a device that is often kept in close proximity to the user (a laptop, a portable games console, a mobile phone, a fitness tracker, head mounted display, or the like).

Therefore, optionally at least rendering unit 200 of the graphics rendering system may be comprised within a portable or wearable device. That is to say, at least rendering unit 200 may be comprised within a device that is typically held on or affixed to a user's person, or is otherwise typically held by or comes into contact with the user. As will be appreciated by persons skilled in the art, the use of the term "at least" signifies that other components typically found in graphics rendering systems (that is, computing systems operable to render graphics for display) may optionally be comprised within the wearable or portable device, such components being, say, RAM 40, SSD 50, Data Port 60, Optical Drive 70, A/V Port 90, I/O Bridge 100, a source of electrical energy (such as a battery or charging port, for example), or the like. Moreover, one or more of the sensor(s) 202 may optionally be comprised within the portable or wearable device. Indeed, selecting unit 204, or input unit 206 and gaze tacking unit 208 may optionally be comprised within the wearable or portable device.

The portable or wearable device in question may be one of: (i) a head mounted display, HMD, device; (ii) a mobile phone; (iii) a laptop or tablet computer; (iv) a portable games console; and (v) a fitness tracking device.

It should be noted that the preceding examples are not exhaustive; persons skilled in the art will appreciate that portable or wearable devices other than those mentioned previously are considered within the scope of the present description.

Variant Embodiment(s)

In embodiments, it may be desirable to take into account additional environmental/climatic parameters other than temperature when determining whether rendering unit 200 should perform foveated rendering in order to reduce the computational burden placed thereupon. This is because such other environmental factors may for example affect the rate of heat transfer to/from rendering unit 200 (and other components), and thus the operating temperature thereof, or affect the heat transfer to/perception by the user/wearer of the device.

As a non-limiting example, as the humidity of an ambient fluid (such as air) that surrounds or is contained within a respective part of the graphics rendering system increases, the rate of heat transfer to rendering unit 200 (and other components) thereof—or to the user—may increase, as the increased water content in the air typically causes the specific heat capacity of the air to increase.

Therefore, and turning now to FIG. 4, in embodiments of the present description, the graphics rendering system may comprise one or more sensors 210, which may be respectively operable to detect a humidity within or proximate to at least a respective part of the graphics rendering system, wherein if a value of at least one of the detected temperatures meets or exceeds a respective threshold value, and if a value of at least one of the detected humidities meets or exceeds a respective threshold value, then rendering unit 200 is configured to render a first part of the image content at a first image quality and render a second part of the image content at a second image quality different from the first image quality, in a similar manner to that described elsewhere herein.

As will be appreciated by persons skilled in the art, the humidity thresholds in question, like with the temperature thresholds, may be predetermined or user defined, immutable or dynamically adjustable. Interestingly, the dynamic adjustment of a temperature threshold may be based on the satisfaction of a humidity threshold, and/or vice versa. As a non-limiting example, if a humidity threshold is satisfied, a temperature threshold may be reduced, the rationale behind this being that heat transfer rates increase with humidity and temperature, and thus reducing the temperature threshold should trigger foveated rendering before the heat transfer rate increases to such a level that causes damage to rendering unit 200 (and other components) and/or poses a risk to user discomfort/injury. Alternatively or in addition, the adjustment of humidity thresholds in response to a temperature threshold being satisfied may be carried out.

Regarding types of sensors, the one or more sensor(s) 210 may comprise at least one of: (i) a humidistat; (ii) a hygrometer; and (iii) a moisture meter.

It should be noted that the preceding examples are not exhaustive; persons skilled in the art will appreciate that sensors operable to detect humidity other than those mentioned previously are considered within the scope of the present description.

Summary Embodiment(s)

Hence, in a summary embodiment of the present description, a graphics rendering system comprises: rendering unit 200 is configured to render image content for display; and one or more sensors 202 respectively operable to detect a temperature within or proximate to at least a respective part of the graphics rendering system, wherein if a value of at least one of the detected temperatures meets or exceeds a respective threshold value, then rendering unit 200 is configured to render a first part of the image content at a first image quality and render a second part of the image content at a second image quality different from the first image quality, as described elsewhere herein.

It will be apparent to persons skilled in the art that variations in the aforementioned system as described and claimed herein are considered within the scope of the present invention, including but not limited to that:

- In an instance of the summary embodiment, the first part of the image content corresponds to a predefined region of a display screen that displays the image content, as described elsewhere herein;
- In an instance of the summary embodiment, the first part of the image content corresponds to a region of a display screen within which a given virtual element comprised within the image content is located, as described elsewhere herein;
- In this instance, optionally the graphics rendering system comprises selecting unit 204 configured to select the given virtual element in dependence upon one or more aspects of the image content, the one or more aspects of the image content comprising at least one of: (i) a size and/or shape of the given virtual element within the image content; (ii) a motion of the given virtual element within the image content; and (iii) whether the given virtual element is controllable by a user interacting with the image content—as described elsewhere herein;
- In an instance of the summary embodiment, the graphics rendering system comprises input unit 206 configured to receive one or more images of one or both eyes of a user; and a gaze tracking unit 208 configured to determine, for a display screen that displays the image content, a region of the display screen towards which a gaze of the user is directed in dependence upon one or more of the received images; wherein the first part of the image content corresponds to a region of the display screen that comprises the determined region, as described elsewhere herein;
- In an instance of the summary embodiment, rendering unit 200 is configured to adapt at least one of: (i) a size and/or shape of the first part of the image content; and (ii) a size and/or shape of the second part of the image content—in dependence upon an extent to which the value of the at least one of the detected temperatures exceeds the respective threshold value, as described elsewhere herein;
- In an instance of the summary embodiment, rendering unit 200 is configured to adapt at least one of: (i) the first image quality; and (ii) the second image quality—in dependence upon an extent to which the value of the at least one of the detected temperatures exceeds the respective threshold value, as described elsewhere herein;
- In an instance of the summary embodiment, rendering unit 200 is configured to adapt a total number of parts of the image content that are to be rendered at a respective image quality in dependence upon an extent to which the value of the at least one of the detected parameters exceeds the respective threshold value, as described elsewhere herein, and this dependency may relate to the extent in a continuous or stepped fashion, and linearly or non-linearly, as appropriate;
- In an instance of the summary embodiment, one or more of the sensors are respectively operable to detect a temperature of an ambient fluid that surrounds or is contained within a respective part of the graphics rendering system, as described elsewhere herein;
- In an instance of the summary embodiment, the one or more sensors comprise at least one of: (i) a thermometer; (ii) a temperature probe; and (iii) a thermal camera, —as described elsewhere herein;
- In an instance of the summary embodiment, the graphics rendering system may comprise one or more sensors 210 respectively operable to detect a humidity within or proximate to at least a respective part of the graphics rendering system, wherein if a value of at least one of the detected temperatures meets or exceeds a respective threshold value, and if a value of at least one of the detected humidities meets or exceeds a respective threshold value, then rendering unit 200 is configured to render a first part of the image content at a first image quality and render a second part of the image content at a second image quality different from the first image quality, as described elsewhere herein;
- In an instance of the summary embodiment, at least rendering unit 200 is comprised within a portable or wearable device, as described elsewhere herein; and
- In this instance, optionally the portable or wearable device is one of: (i) a head mounted display, HMD, device; (ii) a mobile phone; (iii) a laptop or tablet computer; (iv) a portable games console; and (v) a fitness tracking device.

Graphics Rendering Method

Turning now to FIG. 5, a graphics rendering method comprises the following steps: Step S100: rendering image content for display by using a rendering unit (such as rendering unit 200) that is comprised within a graphics rendering system, as described elsewhere herein. Step S102: detecting a temperature within or proximate to at least a respective part of the graphics rendering system by using one or more sensors (such as sensor(s) 202) that are respectively operable to do so, as described elsewhere herein. Step S100A: if a value of at least one of the detected temperatures meets or exceeds a respective threshold value, then rendering step S100 comprises rendering a first part of the image content at a first image quality and render a second part of the image content at a second image quality different from the first image quality, as described elsewhere herein.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:

one or more computers and one or more storage devices on which are stored instructions that are operable, when executed by the one or more computers, to cause the one or more computers to perform operations comprising:

rendering image content for display;

detecting, using one or more sensors, a rate of temperature change for a set period of time within or proximate to at least a respective part of a graphics rendering system;

comparing the detected rate of temperature change to a threshold value;

determining that the detected rate of temperature change satisfies a rate threshold and the rate of temperature change continues over a threshold duration; and in response to determining the detected rate of temperature change satisfies the rate threshold and the rate of temperature change continues over a threshold duration, rendering a first part of the image content at a first image quality and a second part of the image content at a second image quality, the second image quality being different from the first image quality.

2. The system according to claim 1, wherein the first part of the image content corresponds to a predefined region of a display screen that displays the image content.

3. The system according to claim 1, wherein the first part of the image content corresponds to a region of a display screen within which a given virtual element comprised within the image content is located.

4. The system according to claim 3, further comprising selecting the given virtual element in dependence upon one or more aspects of the image content, the one or more aspects of the image content comprising at least one of:

i. a size and/or shape of the given virtual element within the image content;

ii. a motion of the given virtual element within the image content; or iii. whether the given virtual element is controllable by a user interacting with the image content.

5. The system according to claim 1, comprising:

receiving one or more images of one or both eyes of a user; and determining, for a display screen that displays the image content, a region of the display screen towards which a gaze of the user is based on the one or more received images;

wherein the first part of the image content corresponds to a region of the display screen that comprises the determined region.

6. The system according to claim 1, wherein rendering image content for display is based on at least one of:

i. a size and/or shape of the first part of the image content; or ii. a size and/or shape of the second part of the image content, and is based on an extent to which a value of the detected rate of temperature change exceeds the rate threshold.

7. The system according to claim 1, wherein rendering image content for display is based on at least one of the first image quality or the second image quality, and is based on an extent to which a value of the detected rate of temperature change exceeds the rate threshold.

8. The system according to claim 1, wherein rendering image content for display is based on a total number of parts of the image content that are to be rendered at a respective image quality and based on an extent to which a value of the detected rate of temperature change exceeds the rate threshold.

9. The system according to claim 1, wherein detecting, using the one or more of the sensors, the rate of temperature change further comprises detecting, using the one or more sensors, the rate of temperature change of an ambient fluid that surrounds or is contained within a respective part of the graphics rendering system.

10. The system according to claim 1, wherein the one or more sensors comprise at least one of a thermometer, a temperature probe, or a thermal camera.

11. The system according to claim 1, comprising:

detecting, using the one or more sensors, a humidity within or proximate to at least the respective part of the graphics rendering system;

comparing the detected humidity to a humidity threshold value;

determining the detected humidity satisfies the humidity threshold value; and in response to determining the detected temperature satisfies the temperature threshold value and the detected humidity satisfies the humidity threshold value, rendering a first part of the image content at a first image quality and a second part of the image content at a second image quality, the second image quality being different from the first image quality.

12. The system according to claim 1, wherein the graphics rendering system is comprised within a portable or wearable device.

13. The system according to claim 12, wherein the portable or wearable device is at least one of (i) a head mounted, HMD, device, (ii) a mobile phone, (iii) a laptop or tablet computer, (iv) a portable games console, of (v) a fitness tracking device.

14. A method comprising:

rendering image content for display;

detecting, using one or more sensors, a rate of temperature change for a set period of time within or proximate to at least a respective part of a graphics rendering system;

comparing the detected rate of temperature change to a threshold value;

determining that the detected rate of temperature change satisfies a rate threshold and the rate of temperature change continues over a threshold duration; and in response to determining the detected rate of temperature change satisfies the rate threshold and the rate of temperature change continues over a threshold duration, rendering a first part of the image content at a first image quality and a second part of the image content at a second image quality, the second image quality being different from the first image quality.

15. The method according to claim 14, wherein the first part of the image content corresponds to a predefined region of a display screen that displays the image content.

16. The method according to claim 14, wherein the first part of the image content corresponds to a region of a display screen within which a given virtual element comprised within the image content is located.

17. The method according to claim 16, further comprising selecting the given virtual element in dependence upon one or more aspects of the image content, the one or more aspects of the image content comprising at least one of:

i. a size and/or shape of the given virtual element within the image content;

ii. a motion of the given virtual element within the image content; or iii. whether the given virtual element is controllable by a user interacting with the image content.

18. The method according to claim 14, comprising:

receiving one or more images of one or both eyes of a user; and determining, for a display screen that displays the image content, a region of the display screen towards which a gaze of the user is based on the one or more received images;

wherein the first part of the image content corresponds to a region of the display screen that comprises the determined region.

19. The method according to claim 14, wherein rendering image content for display is based on at least one of:

i. a size and/or shape of the first part of the image content; or ii. a size and/or shape of the second part of the image content, and is based on an extent to which a value of the detected rate of temperature change exceeds the rate threshold.

20. One or more non-transitory computer storage media encoded with computer program instructions that when executed by one or more computers cause the one or more computers to perform operations comprising:

rendering image content for display;

detecting, using one or more sensors, a rate of temperature change for a set period of time within or proximate to at least a respective part of a graphics rendering system;

comparing the detected rate of temperature change to a threshold value;

determining that the detected rate of temperature change satisfies a rate threshold and the rate of temperature change continues over a threshold duration; and in response to determining the detected rate of temperature change satisfies the rate threshold and the rate of temperature change continues over a threshold duration, rendering a first part of the image content at a first image quality and a second part of the image content at a second image quality, the second image quality being different from the first image quality.

* * * * *